Patented June 23, 1942

2,287,732

UNITED STATES PATENT OFFICE 2,287,732

PROCESS FOR RECLAIMING SULPHURIC ACID

Frederick E. Frey and Ralph C. Cole, Bartlesville, Okla., assignors to Phillips Petroleum Company, a corporation of Delaware No Drawing. Application September 2, 1939, Serial No. 293,302

3 Claims. (Cl. 23—172)

This invention relates to a process of reclaiming sulphuric acid, and more particularly to the reclaiming of sulphuric acid that has been used as a catalyst or condensation agent for the interreaction or juncture of isoparaffin and olefin hydrocarbons to form branched paraffin hydrocarbons having molecular weights higher than the initial isoparaffins.

In the presence of sulphuric acid of high strength, isoparaffins such as isobutane, isopentane, isohexane, and the like add to or condense with certain olefins such as propylene, isobutylene, 1-butene, 2-butene and the like to form mainly isoparaffins of higher molecular weight. The original isoparaffin then is said to be alkylated with the olefin. Polymers of olefins may be used instead of the olefins themselves; for example, di-isobutylene and tri-isobutylene produce substantially the same alkylation products with isobutane as does isobutylene. Co-polymers such as those formed by the juncture of isobutylene to 1-butene or 2-butene or propylene or the like may be used in the same way. The alkylation products are highly useful as motor fuel, having desirably high octane-number ratings and being highly responsive to the addition of anti-knock agents such as tetra-ethyl lead.

When fresh the acid has a strength approaching 100 per cent, such as 95 to 97 per cent. During use the acid becomes diluted by various organic by-products until it no longer can effect a desirably high rate of alkylation. It then may have a concentration of the order of 80 to 90 per cent, being diluted for the most part with organic material. Such spent acid generally must either be reconditioned for re-use or be disposed of at considerable trouble and expense.

The organic by-products in the spent acid make reclamation of it quite difficult. Various attempts to concentrate the acid by such well known processes as evaporation and extraction have not been successful. The by-products apparently have properties that favor retention of them by the acid instead of removal by solvents that are immiscible with the acid. For example, only a relatively negligible amount of organic material could be extracted from spent acid by isopentane. Similarly, no large proportion of the organic by-products could be removed by heating the acid in an open vessel. Keeping the acid at 100 to 160° F. for 12 hours caused no separation of an oily layer nor any appreciable concentration of the acid by evaporation. At temperatures of about 160° F. and higher much decomposition occurred, and carbon was formed, at the expense of the sulphuric acid, which was reduced to sulphur dioxide and water. Attempts to oxidize or to remove the organic by-products by means of air blown through the spent acid at various temperatures were similarly unsuccessful.

Simple calculations show that only about 12.5 per cent by weight of organic material in the spent acid would be sufficient to reduce all of the sulphuric acid to sulphur dioxide if the organic material reacted to form only carbon and water and that less than 5 per cent would be sufficient to consume all of the sulphuric acid if in addition the carbon were oxidized to carbon dioxide. Apparently, therefore, the major part of the organic by-products must be removed before the spent acid can be concentrated to a strength suitable for re-use for the condensation of isoparaffins with olefins.

An object of this invention is to provide a process for the recovery and reconditioning of sulphuric acid used for the condensation of isoparaffins with olefins, so that it may be used again for such condensation.

Another object is to remove by-products from the acid used to effect condensation of isoparaffins with olefins.

Another object is the removal from the spent acid, in addition to oils whose release is effected by addition of water, additional small amounts of organic material not so eliminated whose presence reduces the yield of reclaimed acid by effecting its partial destruction to form sulphur dioxide in the final concentrating.

Other objects and advantages of this invention will become obvious to those skilled in the art.

The invention comprises, in combination, the following steps: the spent sulphuric acid is diluted greatly with water, which causes an oil to separate out; the oil is removed mechanically as by the separation of immiscible liquids; the diluted acid is digested or kept at its boiling point for some time, with or without agitation by steam; additional oil separated out during the digesting is removed; residual oil and/or other organic compounds, some of which are retained in solution, are volatilized and removed by steam distillation, effected by boiling and/or injection of steam; and finally the acid is concentrated by evaporation of water. The digesting, steam-distilling, and concentrating preferably may be carried on simultaneously by merely boiling the diluted acid without the injection of added steam. The concentrated acid then may be used again for the condensation of isoparaffins with olefins.

During the final step of concentrating the acid, beginning at a temperature of about 340° F., a considerable amount of tarry carbonaceous or pitch-like material often separates out. The tarry material appears to have two deleterious effects: (1) promotion of an undesirable frothing, and (2) destruction of sulphuric acid by reduction to sulphur dioxide. In a modification of the invention, the concentrating advantageously is interrupted when the tarry material has separated out, suitably when the temperature of the acid is in the neighborhood of about 392° F. The tarry material is removed by filtering and then the concentrating is resumed. The removal of the tarry material is a part of this invention. Although concentrating the acid can be effected without the removal, the organic material in the tar reacts so extensively with the sulphuric acid during the concentrating at the high temperature of the final concentration step that the removal results in an appreciable increase in the final yield of reclaimed acid. Simultaneously, the troublesome frothing is greatly diminished by the removal of the tarry material, and the evolution of obnoxious sulphur dioxide fumes is minimized. Such removal of tarry carbonaceous material during the concentrating may be repeated as often as is desired; generally one or two filterings are adequate. If desired, for greater ease in filtering, the acid may be cooled and/or diluted, preferably with at least its own weight of water, before the filtering, or an inert adsorbent such as active charcoal, active silica, and the like may be added to or suspended in the acid for the purpose of serving as a filter-aid and removing some of the dissolved or colloidally suspended carbonaceous matter by selective adsorption.

The proportion of water to be used in the initial dilution of the spent acid is not critical and may be varied over wide limits, provided that it is at least sufficient to cause precipitation or separation of a large part of the organic matter dissolved in the spent acid. A ratio of water to spent acid between about 1:1 and 10:1 by weight is generally suitable; a ratio between about 1.5:1 and 4:1 is preferred if steam is not injected into the acid during the subsequent digestion and steam distillation, and a ratio between about 1:1 and 1.5:1 is preferred if steam is to be injected.

The initial dilution of the spent acid preferably is effected by adding the spent acid to the water. Considerable heat is evolved during the dilution, and the resulting increase in temperature appears to favor separation of oil from the diluted acid. However, if desired, the dilution may be effected by adding the acid to ice instead of water. The melting of the ice consumes the heat of dilution of the acid, thereby minimizing any tendency for the sulphuric acid to be reduced to sulphur dioxide. When large amounts of ice are not used or when other cooling means are not resorted to and therefore a relatively low temperature does not result, it is preferable not to have the temperature at this point exceed about 300° F.

After this initial removal of organic material, as an oil, there remains in the aqueous acid solution additional organic material which must be removed before the acid can be concentrated. We have found that this can be removed in one or the other, or both, of two forms by heating the solution and evaporating water. If the solution is dilute and/or additional quantities of water are added during the heating as with steam distillation, a major part or all of this material can be removed by volatilization and can be recovered in the distillate. This material will often comprise or consist of oxygenated compounds such as alcohols or ethers or the like, which in themselves often have commercial value. When the solution is not so dilute, or when it is allowed to become more concentrated as the solution is heated, we have found that a tarry material is formed and is separated, and can be removed as discussed without serious injury to the sulphuric acid.

The following examples are given for the sake of illustrating possible modes of procedure; they are not to be taken as establishing limitations of the invention.

Example I

One volume of sulphuric acid of an original concentration of 96 per cent was used for six successive runs in which isopentane was alkylated with tri-isobutylene at about 32° F. The acid then amounted to 1.76 volumes, but on standing overnight it decreased to 1.32 volumes because of the separation of a hydrocarbon layer. The acid layer had a specific gravity of 1.58 at 75° F. and contained 75.7 per cent sulphuric acid by weight. It was diluted by being added to cracked ice equivalent to five times its own volume of water. The dark oily layer that separated out during the dilution was removed, and the diluted acid was boiled, whereupon considerable additional organic matter was removed with the steam. A part of the organic matter removed with the steam separated out as an oil from the condensed distillate water, and a part, probably alcohols and ethers, remained in solution. The boiling was continued until a heavy oil or tar, which hardened to a coke-like substance on cooling in air, separated out. The acid residue then was diluted again with five times its own volume of water, was filtered, and was subjected again to concentration by boiling, this time until sulphur trioxide fumes appeared. Some additional tar was formed during the boiling; this was removed by dilution of the acid as before and filtering. The filtrate was practically water white and darkened only slightly when it was reconcentrated by boiling until sulphuric acid could be seen condensing on the sides of the distillation flask. The reclaimed acid thus obtained had a specific gravity of 1.845 at 75° F. and contained 96.6 per cent sulphuric acid, as determined by titration with standardized alkali. The sulphuric acid recovered amounted to 73.4 per cent of that present in the original spent acid. On being returned to the process of alkylation of isoparaffins with olefins, it was found to be fully as effective as chemically pure acid of the same strength.

Example II

Sulphuric acid spent in several successive runs for the alkylation of isopentane with tri-isobutylene at 77 to 80° F. was diluted with an equal volume of water without cooling. A black oil having a specific gravity of 0.886 at 68° F. separated from the diluted acid, which was dark red in color. After removal of the oil, the acid was steam-distilled for 3 hours and then filtered to remove some tarry carbonaceous matter that had separated out. Then it was boiled until the temperature reached 572° F., after which it was diluted and filtered again. The total carbonaceous matter removed by filtration, if assumed to be merely carbon, was sufficient to effect a loss of about one-fourth of the sulphuric acid originally present in the spent acid, by reaction to form sulphur dioxide and carbon dioxide. Finally the acid was concentrated again by boiling until the boiling point became 617° F. The light brown product contained 98.8 per cent sulphuric acid and represented a recovery of 81 per cent of the sulphuric acid present in the spent acid.

*Example III*

Sulphuric acid that had been used for the alkylation of isobutane with a mixture of triisobutylene and heavier polymers of isobutylene was diluted by being added to 1.66 times its own weight of cracked ice. A black oil having about two-fifths of the original volume of the spent acid separated out. After the oil had been removed, the acid was concentrated by boiling. At a temperature of about 338° F. a black froth-provoking tar began to separate out. The frothing subsided when the temperature reached about 518° F. The concentrating was continued until the temperature reached 608° F. The acid thus reclaimed had a concentration of 94.8 per cent and represented a recovery of 84 per cent of the sulphuric acid present in the spent acid. Although having a dark color and having the odor of sulphur dioxide, the reclaimed acid was suitable for re-use in the alkylation of isoparaffins with butylenes.

*Example IV*

Spent sulphuric acid, which had been used for the alkylation of isobutane with polymers of isobutylene, was diluted by being added to 1.66 times its own weight of ice. After being freed from the oil that separated out, the diluted acid was steam-distilled for 5 hours and then concentrated by boiling until the temperature reached 608° F. The product contained 95.1 per cent sulphuric acid and represented a recovery of 82.5 per cent of the sulphuric acid present in the spent acid.

The foregoing examples indicate that the process of the present invention effects a recovery of up to about 85 per cent of the sulphuric acid in spent acid from the alkylation of isoparaffins with olefins. The by-products produced during the alkylation are removed, and the acid is restored to a condition in which it is suitable for re-use in such alkylation.

Since many modifications of the invention will be obvious to those skilled in the art, the invention should not be unduly limited by the foregoing specification, but it should be understood to be as extensive in scope and equivalents, within the scope of the appended claims, as the prior art allows.

We claim:

1. The process of reclaiming sulphuric acid that has become spent in use as a catalyst for the alkylation of low boiling isoparaffins with olefins to produce saturated hydrocarbons in the motor fuel boiling range, which comprises adding the spent acid to from 1.5 to 4 times its own weight of ice to cool the material to a subatmospheric temperature and cause an oil to be precipitated, removing said oil mechanically, steam distilling the diluted acid by concomitant heating and injection of steam to remove additional organic material present in the spent acid without substantially concentrating said acid; subsequently evaporating water until a tarry carbonaceous material has become precipitated; diluting the residual acid with at least its own weight of water; filtering off the tarry material; and removing water from the filtered acid until the acid becomes concentrated to a strength suitable for re-use for the alkylation of isoparaffins with olefins and has a free sulphuric acid content of at least about 95 per cent.

2. The process of reclaiming sulphuric acid that has become spent in use as a catalyst for the alkylation of low boiling isoparaffins with olefins to produce saturated hydrocarbons in the motor fuel boiling range which comprises adding the spent acid to from 1.5 to 4 times its own weight of ice to cool the material to a subatmospheric temperature and cause an oil to be precipitated, removing said oil mechanically, steam distilling the diluted acid by concomitant heating and injection of steam to remove additional organic material present in the spent acid without substantially concentrating said acid and subsequently removing water from the acid until it becomes concentrated to a strength suitable for re-use for the alkylation of isoparaffins with olefins and has a free sulphuric acid content of at least about 95 per cent.

3. The process of reclaiming sulphuric acid that has become spent in use as a catalyst for the alkylation of low boiling isoparaffins with olefins to produce saturated hydrocarbons in the motor fuel boiling range, which comprises adding the spent acid to an amount of ice not substantially in excess of about 4 times its own weight and sufficient to produce a resultant mixture at a temperature substantially below atmospheric to dilute the spent acid and cause an oil to be separated, removing said oil mechanically, steam distilling the diluted acid by concomitant heating and injection of steam to remove additional organic material present in the spent acid without substantially concentrating said acid, and subsequently concentrating the dilute and purified spent acid to a strength suitable for reuse as a catalyst for the alkylation of isoparaffins with olefins.

FREDERICK E. FREY.
RALPH C. COLE.